(12) United States Patent
Kusaka

(10) Patent No.: US 11,567,462 B2
(45) Date of Patent: Jan. 31, 2023

(54) DATA COLLECTION SYSTEM, PROCESSING SYSTEM, AND STORAGE MEDIUM

(71) Applicant: KABUSHIKI KAISHA TOSHIBA, Minato-ku (JP)

(72) Inventor: Tsubasa Kusaka, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 120 days.

(21) Appl. No.: 16/802,287

(22) Filed: Feb. 26, 2020

(65) Prior Publication Data

US 2020/0192305 A1 Jun. 18, 2020

Related U.S. Application Data

(62) Division of application No. 15/808,363, filed on Nov. 9, 2017, now Pat. No. 10,613,487.

(30) Foreign Application Priority Data

Nov. 9, 2016 (JP) .................................. 2016-219229
Mar. 29, 2017 (JP) .................................. 2017-064877

(51) Int. Cl.
*G05B 13/02* (2006.01)
*G05B 13/04* (2006.01)
(Continued)

(52) U.S. Cl.
CPC ....... *G05B 13/0265* (2013.01); *G05B 13/042* (2013.01); *G05B 19/418* (2013.01);
(Continued)

(58) Field of Classification Search
CPC ........ G05B 19/418; G06F 16/13; G06F 9/542
See application file for complete search history.

(56) References Cited

U.S. PATENT DOCUMENTS 4,987,762 A 1/1991 Cash, Sr.
5,363,967 A 11/1994 Tilles
(Continued)

FOREIGN PATENT DOCUMENTS

CN 101639666 2/2010
CN 102667503 9/2012
(Continued)

*Primary Examiner* — Mark A Connolly
(74) *Attorney, Agent, or Firm* — Oblon, McClelland, Maier & Neustadt, L.L.P.

(57) ABSTRACT

According to one embodiment, a data collection system includes an event data collector, a state machine generator, a state machine list, and a state machine driver. The event data collector collects sense signals respectively as a plurality of event data. The state machine generator generates a state machine as a model corresponding to the workpiece. One of the sense signals is acquired when the workpiece is fed into the processing system. The state machine generator generates the state machine and generates an ID for the state machine when the event data collector collects one of the plurality of event data corresponding to the one of the sense signals. The state machine driver drives the state machine retained in the state machine list by sending, to the state machine retained in the state machine list, an event corresponding to another one of the sense signals.

17 Claims, 14 Drawing Sheets

(51) Int. Cl.
*G05B 19/418* (2006.01)
*G06F 9/54* (2006.01)
*G06F 16/13* (2019.01)

(52) U.S. Cl.
CPC .............. *G06F 9/542* (2013.01); *G06F 16/13* (2019.01); *Y02P 90/02* (2015.11)

(56) References Cited

U.S. PATENT DOCUMENTS

| | | |
|---|---|---|
| 5,495,417 A | 2/1996 | Fuduka et al. |
| 5,866,024 A | 2/1999 | De Villeneuve |
| 6,259,056 B1 | 7/2001 | Cowden |
| 9,678,488 B1 | 6/2017 | Dhondt |
| 2001/0041947 A1 | 11/2001 | Patil |
| 2002/0165729 A1 | 11/2002 | Kuebert |
| 2002/0184746 A1 | 12/2002 | Kusmierczyk |
| 2005/0149216 A1 | 7/2005 | Popplewell |
| 2005/0234641 A1* | 10/2005 | Marks .................. G06Q 10/08 701/484 |
| 2006/0064188 A1 | 3/2006 | Ushiku et al. |
| 2006/0129663 A1 | 6/2006 | Labourier |
| 2006/0259176 A1 | 11/2006 | Fujii |
| 2008/0169343 A1 | 7/2008 | Skaaksrud |
| 2009/0228133 A1 | 9/2009 | Loda |
| 2011/0099121 A1 | 4/2011 | Holley |
| 2014/0279795 A1 | 9/2014 | Shibuya et al. |
| 2015/0005903 A1 | 1/2015 | Worek et al. |
| 2015/0243473 A1 | 8/2015 | Price |
| 2016/0124424 A1 | 5/2016 | Strong |
| 2017/0017919 A1 | 1/2017 | Haimi |
| 2017/0124354 A1 | 5/2017 | Rohleder |

FOREIGN PATENT DOCUMENTS

| | | |
|---|---|---|
| CN | 104345726 | 2/2015 |
| JP | 05-151231 | 6/1993 |
| JP | 08-192341 | 7/1996 |
| JP | 11-202903 | 7/1999 |
| JP | 2006-099735 | 4/2006 |
| JP | 2007-241774 | 9/2007 |
| JP | 2009-009399 | 1/2009 |
| JP | 2010-015205 | 1/2010 |
| JP | 2010-079465 | 4/2010 |
| JP | 2012-146269 | 8/2012 |
| JP | 2012-198838 | 10/2012 |
| JP | 2015-181072 | 10/2015 |
| JP | 2016-106325 | 6/2016 |
| WO | 2013/030984 | 3/2013 |
| WO | WO 2011/152273 A1 | 7/2013 |

* cited by examiner

FIG. 6

| | UNCONDITIONAL TRANSITION | OK PASSAGE SENSOR ON | NG PASSAGE SENSOR ON | DISPENSE SENSOR ON | COATING START SENSOR ON | COATING END SENSOR ON |
|---|---|---|---|---|---|---|
| START STATE (FEED) | BEFORE PROCESSING / FEED HISTORY WRITE () | IGNORE | IGNORE | IGNORE | IGNORE | IGNORE |
| BEFORE PROCESSING | IGNORE | IGNORE | IGNORE | IGNORE | IN PROCESSING | IGNORE |
| IN PROCESSING | IGNORE | IGNORE | IGNORE | IGNORE | COATING START HISTORY WRITE () / WAVEFORM EXTRACTION START () | AFTER PROCESSING / COATING END HISTORY WRITE () / WAVEFORM EXTRACTION END () |
| AFTER PROCESSING | IGNORE | INSPECTION OK / OK INSPECTION HISTORY WRITE () | TERMINAL STATE / NG INSPECTION HISTORY WRITE () | IGNORE | IGNORE | IGNORE |
| INSPECTION OK | IGNORE | IGNORE | IGNORE | TERMINAL STATE / DISPENSE HISTORY WRITE () | IGNORE | IGNORE |
| TERMINAL STATE (DISPENSE) | IGNORE | IGNORE | IGNORE | IGNORE | | |

DATA COLLECTION SYSTEM, PROCESSING SYSTEM, AND STORAGE MEDIUM

CROSS-REFERENCE TO RELATED APPLICATIONS

This application is based upon and claims the benefit of priority from Japanese Patent Application No. 2016-219229, filed on Nov. 9, 2016; and Japanese Patent Application No. 2017-064877, filed on Mar. 29, 2017; the entire contents of which are incorporated herein by reference.

FIELD

Embodiments described herein relate generally to a data collection system, a processing system, and storage medium.

BACKGROUND

To increase the productivity and/or quality of a manufacturing apparatus, various data of the manufacturing apparatus may be collected and analyzed. For example, the final quality, the inspection results, etc., of the product are compared with the data recited above. Improvement opportunities may be identified by tracking the data of products for which poor results are obtained. For such a purpose, a method may be employed in which the ID of the workpiece is read at a timing before and after processing and is associated with process data. However, such a method cannot be employed in the case where the ID does not accompany the workpiece itself or in the case where it is difficult to read the ID at the timing before and after the processing.

It also may be considered to alter the control software of the manufacturing apparatus to perform the data collection while making associations with the workpiece. However, the cost of altering software is large. Further, in such a case, it is necessary to alter the software for each manufacturing apparatus.

BRIEF DESCRIPTION OF THE DRAWINGS

FIG. 6 is a state transition table corresponding to the state transition diagram of FIG. 5 displayed on the GUI screen;

DETAILED DESCRIPTION

Figure 1:
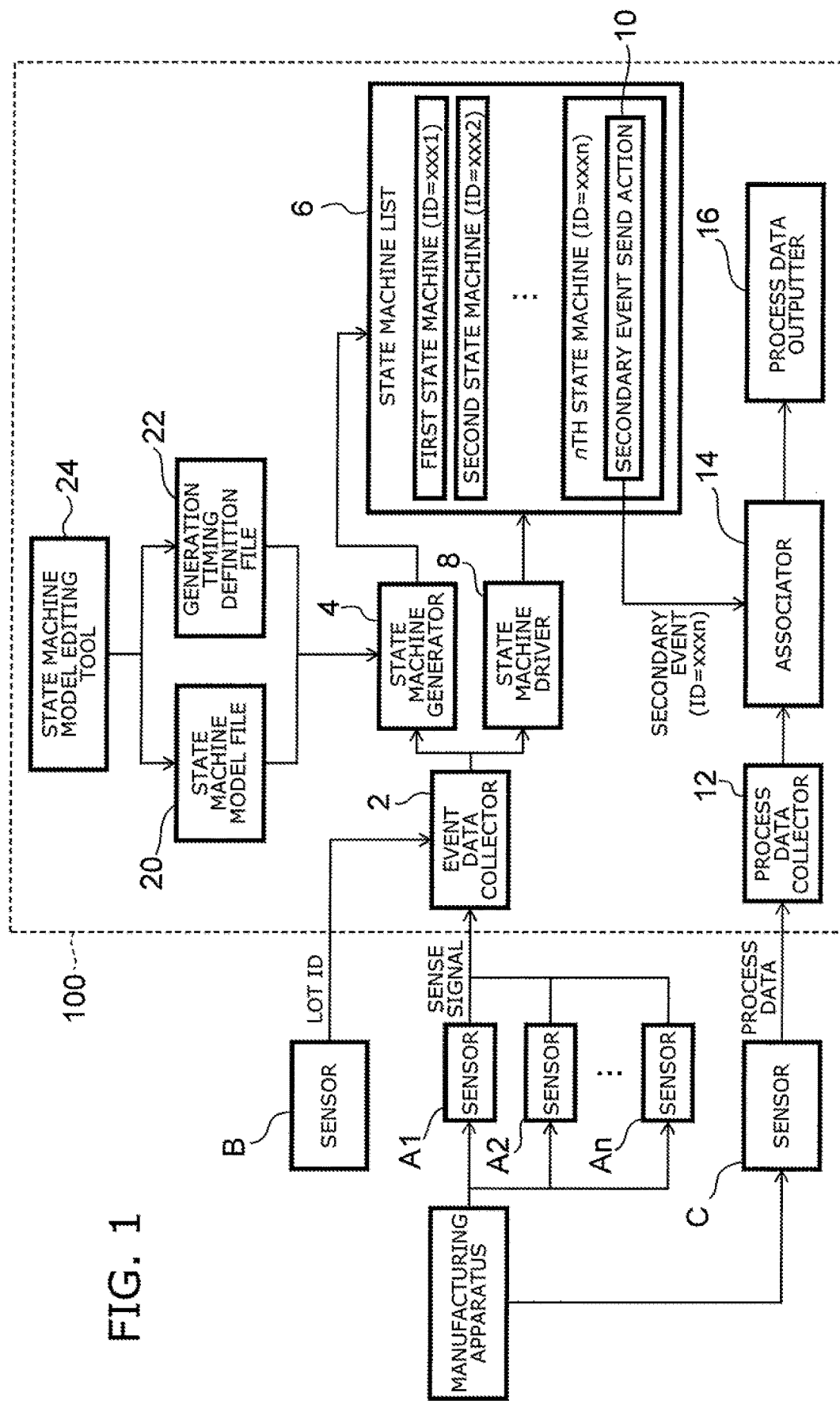
FIG. 1 is a block diagram illustrating the configuration of the data collection system according to the first embodiment.

According to one embodiment, a data collection system includes an event data collector, a state machine generator, a state machine list, and a state machine driver. The event data collector collects a plurality of sense signals respectively as a plurality of event data. Each of the plurality of sense signals is acquired when a passage of a workpiece in a processing system is sensed. The state machine generator generates a state machine as a model corresponding to the workpiece. The state machine includes a plurality of states, a transition between the plurality of states, and an action. One of the plurality of sense signals is acquired when the workpiece is fed into the processing system. The state machine generator generates the state machine and generates an ID for the state machine when the event data collector collects one of the plurality of event data corresponding to the one of the plurality of sense signals. The state machine list retains the generated state machine. The state machine driver drives the state machine retained in the state machine list by sending, to the state machine retained in the state machine list, an event corresponding to another one of the plurality of sense signals.

Embodiments of the invention will now be described with reference to the drawings.

In the drawings and the specification of the application, components similar to those described thereinabove are marked with like reference numerals, and a detailed description is omitted as appropriate.

An overview of a data collection system 100 according to a first embodiment will now be described with reference to FIG. 1 and FIGS. 2A and 2B.

Figure 2:
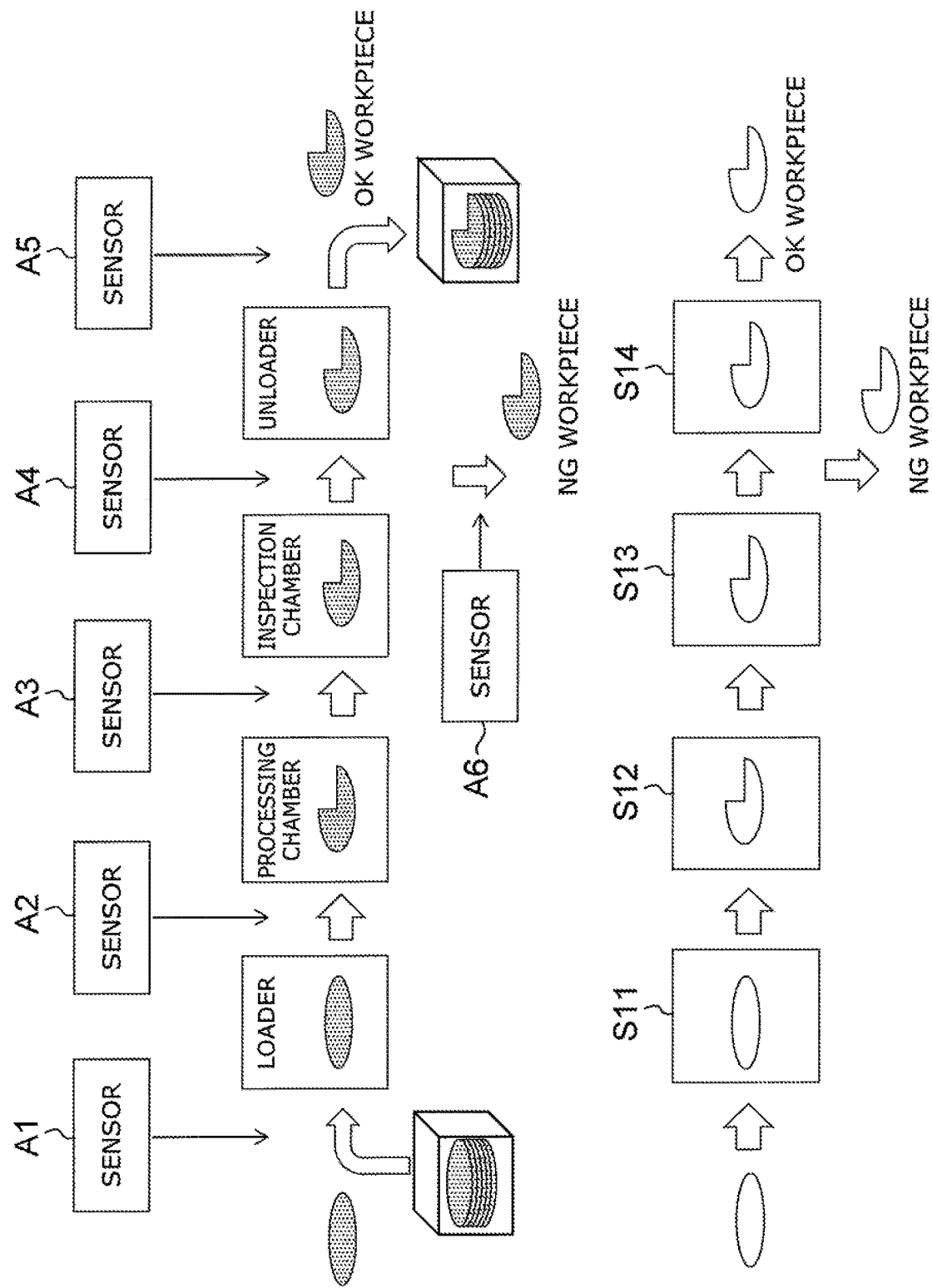
FIG. 2A is a schematic view illustrating an example of the processing of an actual workpiece and FIG. 2B is a schematic view illustrating the processing of a virtual workpiece corresponding to FIG. 2A.

FIG. 1 is a block diagram illustrating the configuration of the data collection system 100 according to the first embodiment.

FIG. 2A is a schematic view illustrating an example of the processing of an actual workpiece. FIG. 2B is a schematic view illustrating the processing of a virtual workpiece corresponding to FIG. 2A.

As illustrated in FIG. 1, the data collection system 100 includes an event data collector 2, a state machine generator 4, a state machine list 6, a state machine driver 8, a process data collector 12, an associator 14, a process data outputter 16, a state machine model file 20, a generation timing definition file 22, and a state machine model editing tool 24.

The data collection system 100 is applied to a processing system in which multiple sensors are provided. FIG. 2A illustrates a manufacturing apparatus as an example of the processing system. The case will now be described where the data collection system 100 is applied to the manufacturing apparatus.

In the example illustrated in FIG. 2A, a container in which multiple workpieces are stored is placed in the manufacturing apparatus. The workpieces are removed from the container one at a time by a robot. The workpieces that are removed are sequentially conveyed through a loader, a processing chamber, and an inspection chamber. The workpieces that are determined to be good parts in the inspection chamber are conveyed to an unloader. The workpieces that are determined to be defective parts are removed without being conveyed to the unloader.

Multiple sensors A1 to An sense the passage of the workpiece at each part of the manufacturing apparatus. When the passage of the workpiece is sensed, each of the sensors transmits a sense signal of the passage to the event data collector 2. The sensors A1 to An include, for example, sensors such as proximity sensors, photoelectric sensors, etc., that sense an object.

The manufacturing apparatus may include robot arms; the conveyance of the workpiece may be performed by the robot arms. In such a case, the sensors may sense the passage of the workpiece by sensing the movement of the robot arms.

The embodiments of the sensors A1 to An are not limited to these examples. For example, the sensors A1 to An may sense the passage of the workpiece by utilizing a control signal emitted from a controller of the manufacturing apparatus, etc. In the case where the data collection system 100 is applied to a manufacturing apparatus that is completed, object detection sensors may be mounted to the manufacturing apparatus and used as the sensors A1 to An. Thereby, the cost of introducing the system can be suppressed. Multiple sensors may be used in combination at one location in the case where the passage of the workpiece at the one location cannot be sensed using one sensor.

A sensor B senses information (e.g., a lot ID) accompanying the workpiece and transmits the information to the event data collector 2. For example, in the case where a barcode accompanies the container in which the workpieces are stored, the sensor B is a barcode reader that reads a barcode.

The event data collector 2 collects, as event data, the sense signals transmitted from the sensors A1 to An. In other words, multiple event data is generated in the event data collector 2 based on the sense signals transmitted from the sensors A1 to An. The multiple event data indicate events occurring at the multiple parts of the manufacturing apparatus. In the example illustrated in FIG. 2A, the events are the "feeding of the workpiece into the manufacturing apparatus," the "feeding of the workpiece into the processing chamber," etc. Information that is transmitted from the sensor B also is stored in the event data collector 2. In the case where multiple sensors are provided at one location, the event data collector 2 may collect multiple sensing results as one event datum.

The event data of the workpiece fed into the manufacturing apparatus is generated by the event data collector 2. At this time, the state machine generator 4 generates a state machine corresponding to the workpiece. The state machine is a model corresponding to the workpiece. The state machine includes multiple states, a transition between the multiple states, and an action. These states, transitions, and actions are set prior to the movement of the actual workpiece. The state machine generator 4 generates an ID for the state machine and provides the ID to the state machine. The state machine that is generated behaves as a virtual workpiece. In other words, multiple virtual workpieces that are provided with IDs are generated by the state machine generator 4 to match the feeding of the workpieces into the manufacturing apparatus. The multiple virtual workpieces respectively correspond to the multiple actual workpieces.

The state machine list 6 retains the state machines generated by the state machine generator 4. The state machine list 6 continues to retain the state machines until each state machine expires. The state machine list 6 may retain state machines other than the state machines generated by the state machine generator 4.

The state machine driver 8 drives the state machines retained in the state machine list 6 according to the events collected by the event data collector 2. For example, when the sensor A2 senses that a workpiece is fed into the processing chamber, the state machine driver 8 drives the state machine corresponding to the workpiece. Thereby, the state machine transitions from the state of being inside the loader to the state of being inside the processing chamber.

Each of the state machines includes a secondary event send action 10. The secondary event send action 10 is an action that generates a secondary event according to the events occurring in the state machine. The same ID as that of the state machine accompanies the secondary event.

An "action" means an event in the state machine occurring upon an entry to some state, an exit from the state, or a transition to another state.

A sensor C senses data relating to the processes of the manufacturing apparatus. Specifically, the sensor C acquires waveform data such as the temperature and the pressure of the processing chamber in which the sensed value changes continuously with time. Multiple sensors C may be provided to acquire multiple process data.

The sensor C transmits the acquired waveform data to the process data collector 12. The waveform data that is acquired by the sensor C is stored in the process data collector 12. In the case where the multiple sensors C are provided, the waveform data that is acquired by the sensors C is stored in the process data collector 12.

The associator 14 extracts a portion of the waveform data stored in the process data collector 12 according to the secondary event generated by the secondary event send action 10. The associator 14 associates the extracted waveform data and the ID accompanying the secondary event, Thereby, the state machine and the waveform data are associated using a common ID. The extracted waveform data is output to the outside by the process data outputter 16.

The state machine model file 20 includes an incoming event list and a state list of the state machine. The state list includes the possible states of the state machine. The incoming event list includes the events that cause the transitions between the states included in the state list. The state machine model file 20 also includes guard conditions for performing the condition determination of the transitions, actions such as the sending of secondary events, etc.

The generation timing definition file 22 defines the events generated by the state machine. In other words, the state machine is generated by the state machine generator 4 when an event defined by the generation timing definition file 22 occurs. The generation timing definition file 22 may be expressed using a state machine. This method is used in a virtual loader described below.

The state machine model editing tool 24 is a tool for making and editing the state machine model file 20 and the generation timing definition file 22. The user of the data collection system 100 can make a state machine model on a GUI screen by using the state machine model editing tool 24. The details of the state machine model editing tool 24 are described below.

The data collection system 100 described above is executed using a computer including a CPU, memory, etc. A program for causing the computer to function as the event data collector 2, the state machine generator 4, the state machine list 6, the state machine driver 8, etc., described above is stored in a program storage part of the computer.

For example, the program may be stored in a hard disk or a tangible non-temporary storage medium such as a DVD, a CD, a FD, a MO, a memory card, etc. For example, the program is installed in the computer from any storage medium.

Figure 3:
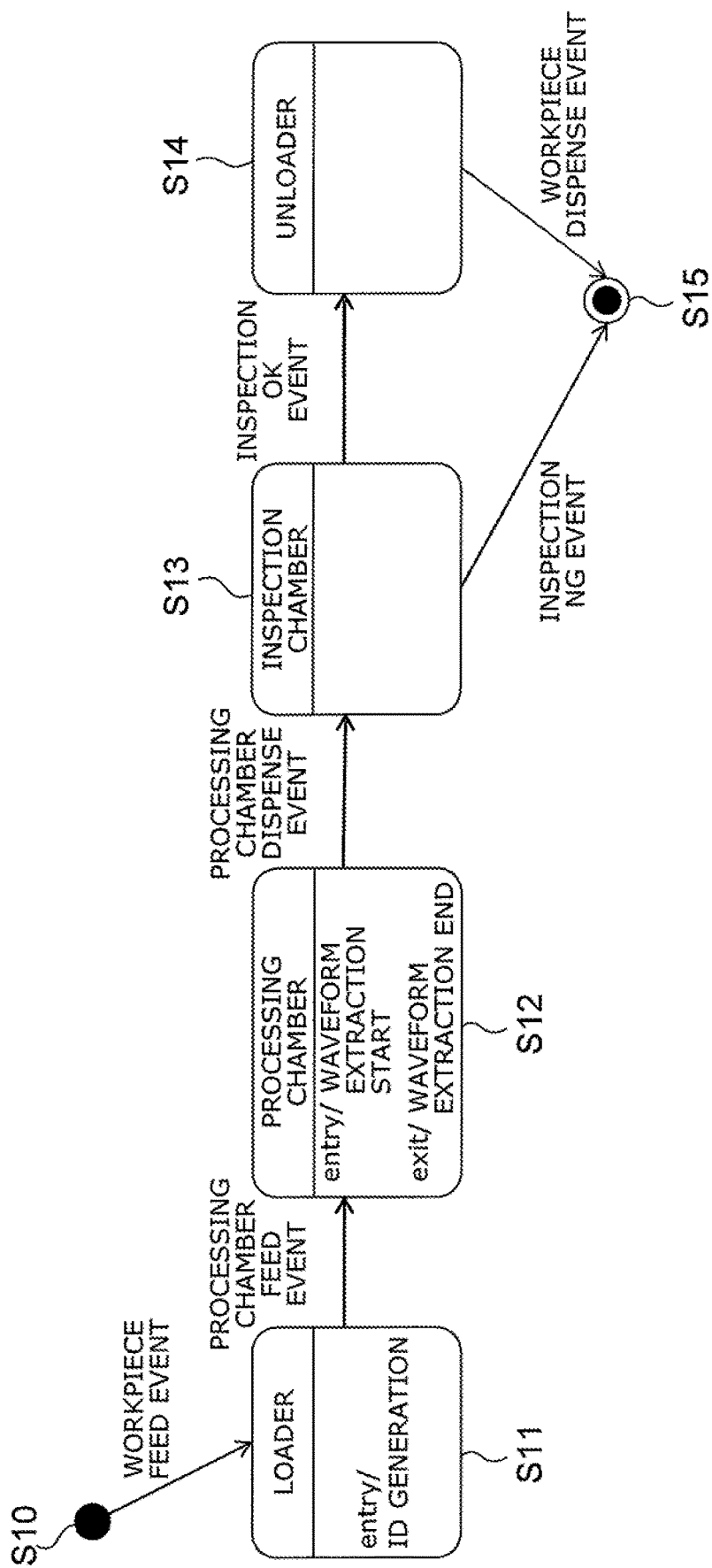
FIG. 3 is a state machine diagram illustrating an example of a virtual workpiece.

One specific example of the operation of the data collection system 100 is described using FIGS. 2A and 2B and FIG. 3.

FIG. 3 is a state machine diagram illustrating an example of a virtual workpiece.

The state machine diagram of FIG. 3 is made using the Unified Modeling Language (UML).

The state machine diagram illustrated in FIG. 3 includes the six states of states S10 to S15. The state S10 is the initial state. The state S15 is the terminal state. The state name is recited in the upper level for each of the states S11 to S14. The arrow between the states illustrates the transition and the direction of the transition. The arrow is accompanied by the "event/[guard condition]/action." The event, the guard condition, and the action each are omissible as appropriate. In the example illustrated in FIG. 3, the characters accompanying the arrows illustrate events. The execution conditions of the actions are recited in the lower level for the states S11 and S12. For example, in the state S11, "entry/ID generation" illustrates that the action of generating the ID is set for an entry into the state S11.

Hereinbelow, as illustrated in FIG. 2A, the workpiece that is processed in the actual manufacturing apparatus is called the "actual workpiece." The state machine illustrated in FIG. 2B is called the "virtual workpiece."

The sensor A1 senses the actual workpiece fed into the loader. The sense signal of the sensor A1 is collected as a workpiece feed event by the event data collector 2. The state machine generator 4 generates a virtual workpiece when the workpiece feed event is generated.

When the workpiece feed event is generated as illustrated in FIG. 3, the virtual workpiece transitions from the initial state S10 to the state S11. The state S11 illustrates the state in which the workpiece is disposed inside the loader. The action of generating the ID is executed for the entry into the state S11. Thereby, an ID is provided to the virtual workpiece.

The actual workpiece that is dispensed from the loader is fed into the processing chamber. The sensor A2 senses the actual workpiece fed into the processing chamber. The event data collector 2 collects the sense signal of the sensor A2 as a feed event into the processing chamber. The state machine driver 8 receives the processing chamber feed event and causes the virtual workpiece to transition from the state S11 to the state S12. The state S12 illustrates the state in which the workpiece is disposed inside the processing chamber.

The action of "waveform extraction start" is executed by the secondary event send action 10 of the virtual workpiece for the entry into the state S12. The secondary event is received; and the extraction of the sensing result (the waveform data) of the sensor C provided inside the processing chamber is started.

When the processing ends, the actual workpiece is dispensed from the processing chamber. The sensor A3 senses the actual workpiece dispensed from the processing chamber. The event data collector 2 collects the sense signal of the sensor A3 as a dispense event from the processing chamber. The state machine driver 8 receives the processing chamber dispense event and causes the virtual workpiece to transition from the state S12 to the state S13. The state S13 illustrates the state in which the workpiece is disposed inside the inspection chamber. At this time, the action of "waveform extraction end" is executed by the secondary event send action 10 of the virtual workpiece. The secondary event is received; and the extraction of the waveform data ends.

The associator 14 refers to the process data collector 12. The associator 14 extracts the waveform data from the reception of the secondary event of the extraction start until the secondary event of the extraction end is received. The ID of the virtual workpiece accompanies these secondary events. The associator 14 associates the ID of the virtual workpiece with the extracted waveform data.

The workpiece that is determined to be a good part in the inspection chamber is conveyed into the unloader. The workpiece that is determined to be a defective part is conveyed into a container for retrieving the defective parts. At this time, the sensor A4 senses the workpieces on the path where the good parts are conveyed. The sensor A6 senses the workpieces on the path where the defective parts are conveyed.

When the sensor A4 senses the actual workpiece, the event data collector 2 collects the sense signal of the sensor A4 as an inspection OK event. The state machine driver 8 receives the inspection OK event and causes the virtual workpiece to transition from the state S13 to the state S14. The state S14 illustrates the state in which the workpiece is disposed inside the unloader.

On the other hand, when the sensor A6 senses the actual workpiece, the event data collector 2 collects the sense signal of the sensor A6 as an inspection NG event. The state machine driver 8 receives the inspection NG event and causes the virtual workpiece to transition from the state S13 to the terminal state S15.

The sensor A5 senses the workpiece dispensed from the unloader. The event data collector 2 collects the sense signal of the sensor A5 as a workpiece dispense event from the manufacturing apparatus. The state machine driver 8 receives the workpiece dispense event and causes the virtual workpiece to transition from the state S14 to the terminal state S15.

The state machine that has transitioned to the terminal state S15 expires. The expired state machine is deleted from the state machine list 6. At this time, information that relates to the state machine is output to the outside and is recorded in a recording medium. The information recited above includes the processes of the state machine from the initial state S10 to the terminal state S15, the ID provided to the state machine, the waveform data associated with the ID, etc.

The example described above will now be described more specifically with reference to FIG. 4.

Figure 4:
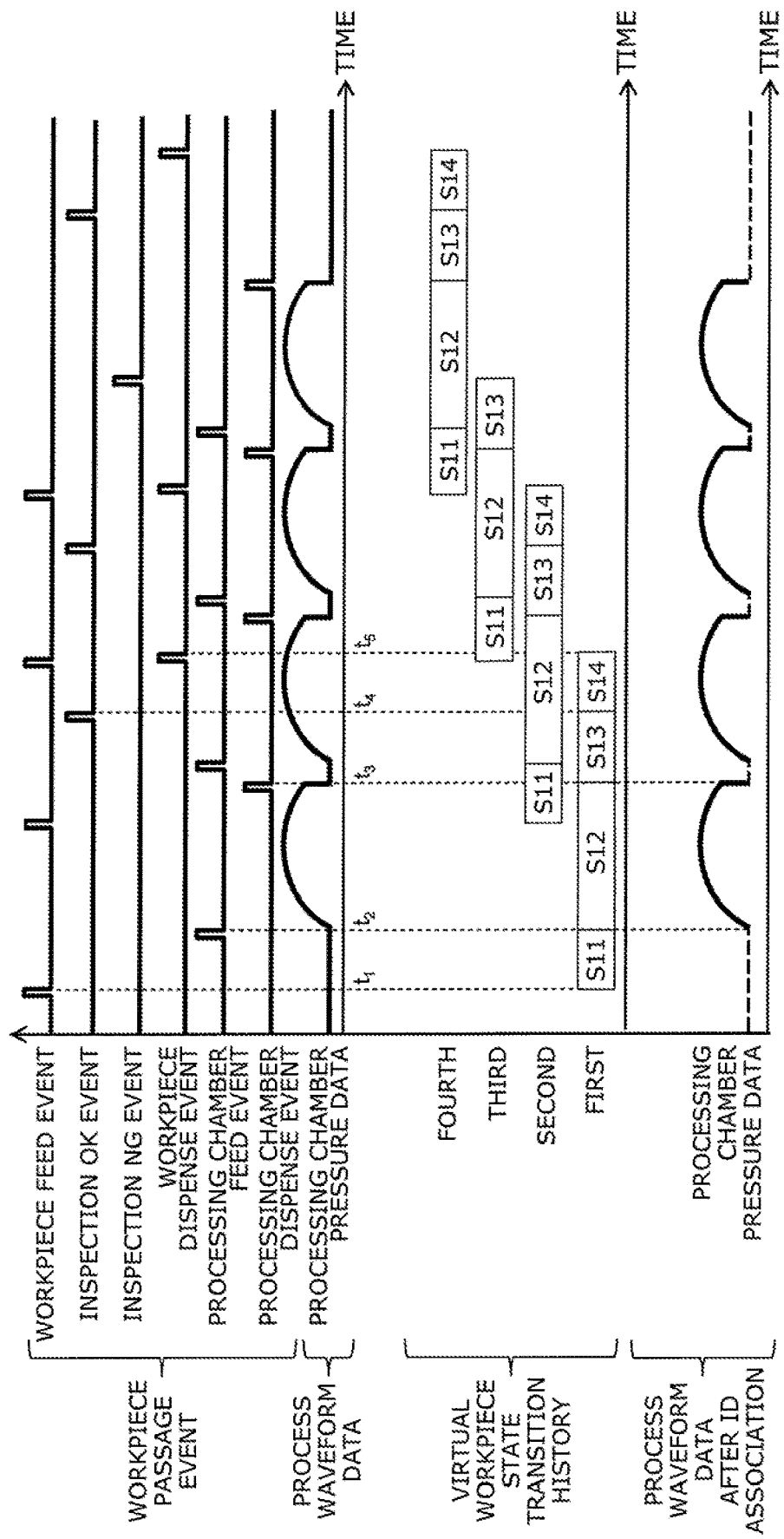
FIG. 4 is a graph illustrating an example of the operations of the manufacturing apparatus and the states of the virtual workpieces corresponding to the operations.

FIG. 4 is a graph illustrating an example of the operations of the manufacturing apparatus and the states of the virtual workpieces corresponding to the operations.

FIG. 4 mainly illustrates, from the upper level, the workpiece passage events collected by the event data collector 2, the waveform data of the process of the processing chamber, the history of the state transition of the virtual workpiece, and the waveform data of the process after the association with the ID.

For the waveform data after the ID association, the portion for which the association is performed is illustrated by solid lines. The portion for which the association is not performed is illustrated by broken lines.

At a time $t_1$, the workpiece feed event is generated. At this time, a first virtual workpiece is generated; and the virtual workpiece transitions to the state S11.

At a time $t_2$ when the processing chamber feed event is generated, the virtual workpiece transitions to the state S12. At this time, the extraction of the pressure data inside the processing chamber is started.

At a time $t_3$ when the processing chamber dispense event is generated, the virtual workpiece transitions to the state S13. At this time, the extraction of the pressure data inside the processing chamber ends.

The waveform data from the time $t_2$ to the time $t_3$ is extracted and is associated with the ID of the first workpiece.

At a time $t_4$ when the inspection OK event is generated, the virtual workpiece transitions to the state S14.

At a time $t_5$ when the workpiece dispense event is generated, the virtual workpiece transitions to the state S15 (the terminal state) and expires.

The states transition according to the occurrence of each event similarly for the second and subsequent workpieces. As the states transition, a portion of the waveform data is extracted and associated respectively with the IDs of the virtual workpieces.

In the example illustrated in FIG. 4, the inspection NG event is generated for the third workpiece; and the third workpiece transitions from the state S13 to the terminal state S15. Therefore, the state S14 is not included in the history of the third virtual workpiece.

In the data collection system 100 according to the first embodiment as described above, the event data collector 2 collects, as event data, the sense signals illustrating the passage of the actual workpiece in the manufacturing apparatus. When the feed event of the workpiece has occurred, the virtual workpiece is generated and an ID is provided by the state machine generator 4. When the other events occur, the state machine driver 8 causes the state of the virtual workpiece to transition to match the state of the actual workpiece.

Thus, the virtual workpiece having the ID is generated; and by causing the state to transition with the movement of the actual workpiece, it is possible to collect the data of the processing processes of the actual workpiece accompanied by the ID. In other words, according to the embodiment, it is possible to easily track the processing processes of each workpiece.

According to the embodiment, by performing the start and the end of the extraction of the waveform data for a designated event, a portion of the waveform data can be extracted and associated with the virtual workpiece. Therefore, for example, in the case where the waveform data of the workpiece determined to be NG at the inspection is to be confirmed, etc., it is also easy to search for the waveform data associated with the ID of the workpiece. Accordingly, it is easy to perform the collection, analysis, etc., of the data for the workpiece determined to be NG at the inspection; and an increase of the productivity and the quality can be realized.

A case is described in the example of the first embodiment described above where the process data is a waveform. In other words, the case is described where the sensed value of the process data fluctuates up and down continuously and periodically. The data collection system 100 according to the embodiment also can collect process data other than waveform data such as data that changes in a step configuration.

Generally, the value fluctuates continuously for waveform data such as temperature, pressure, etc. Therefore, compared to data that changes in a step configuration, it is difficult to designate and perform the association for the portions from the process data corresponding to each workpiece. Therefore, the data collection system 100 according to the embodiment is used particularly favorably for the collection and analysis of waveform data. By using the data collection system 100, the workpiece and a portion of the process data can be associated easily even in the case where the process data is a waveform.

The case is described in the example illustrated in FIG. 2A to FIG. 4 where the process data when processing the workpiece is collected by the data collection system 100. The data collection system 100 according to the embodiment is applicable also to apparatuses other than apparatuses performing processing of the workpiece. For example, the data collection system 100 is widely applicable to the collection of process data when processing a workpiece in a processing system that performs the heating, cleaning, etc., of the workpiece.

The state machine described above can be edited by the state machine model editing tool 24. The state machine is made by using the state machine model editing tool 24 to designate the possible states of the state machine, the received events, the timing when the state machine is generated, the condition of the transition between each state, the transition destination, etc.

Figure 5:
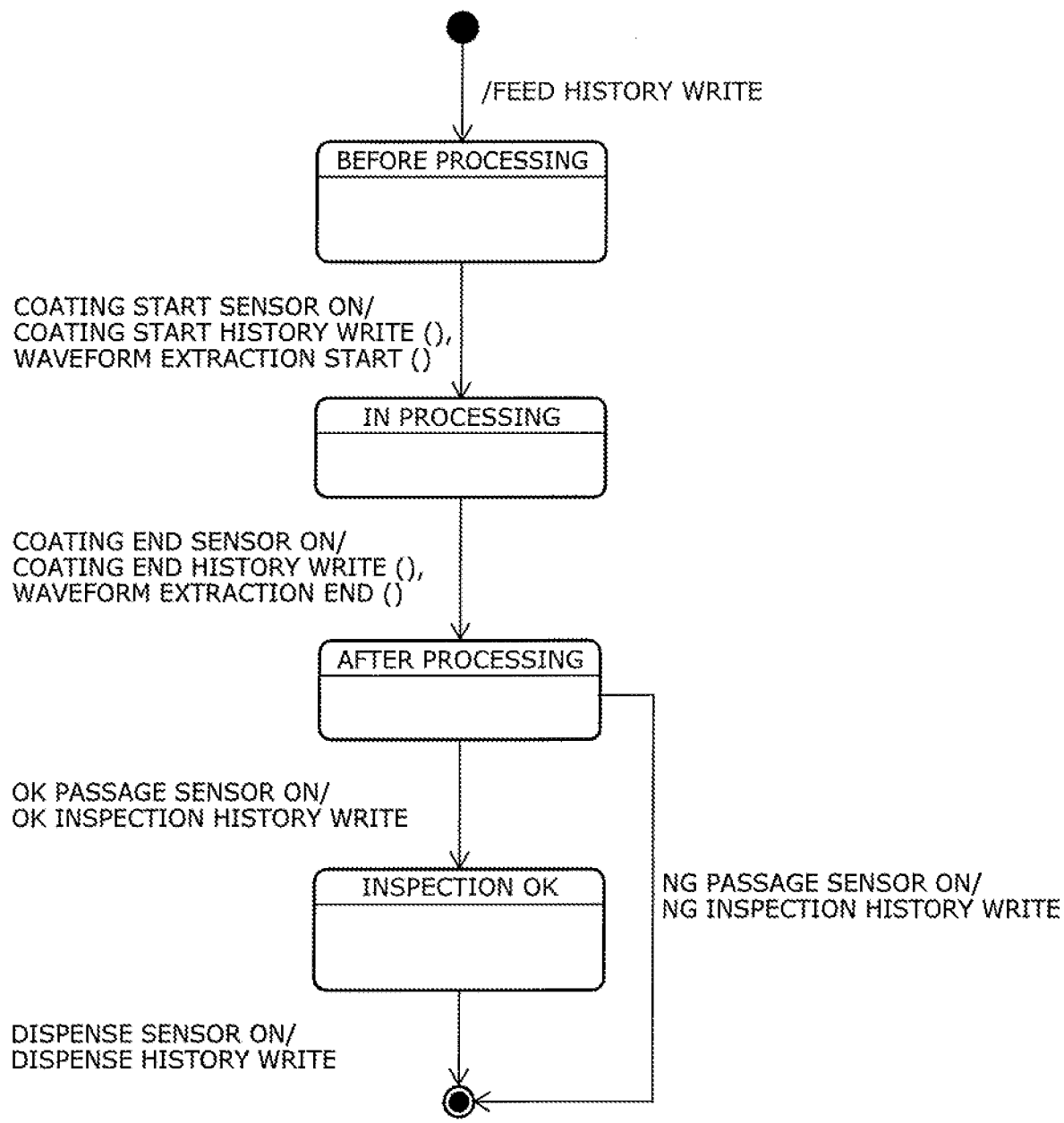
FIG. 5 is an example of a state transition diagram displayed on the GUI screen.

FIG. 5 is an example of a state transition diagram displayed on the GUI screen.

FIG. 6 is a state transition table corresponding to the state transition diagram of FIG. 5 displayed on the GUI screen.

In FIG. 5, the characters accompanying the arrows between each of the states illustrate the "event/actions." In other words, the characters illustrate that the state transition and the recited actions are executed in the case where the recited event occurs.

The user can make the state machine using the state machine model editing tool 24 by using the format of either the state transition diagram or the state transition table such as those illustrated in FIG. 5 and FIG. 6. By using the state machine model editing tool 24, the user can confirm both the state transition diagram and the state transition table. Thereby, it is easy for the user to confirm that none of the items to be set are left out.

The "possible states of the state machine" and the "incoming events" that are set when making the state machine are stored in the state machine model file 20. The "timing when the state machine is generated" is stored in the generation timing definition file 22. The "condition/transition destination of the transition between each state" is stored in the state machine model file 20. Each of these files is stored in a general-purpose format such as XML (Extensible Markup Language), etc., so that the files can be replaced for each manufacturing apparatus used as the object of the data collection.

Multiple state machine model files 20 and multiple generation timing definition files 22 may be registered. For example, the multiple generation timing definition files 22 are necessary in the case where there are multiple feed paths in the apparatus. The multiple state machine model files 20 are necessary in the case where the flow of the workpiece inside the apparatus is different between recipes.

FIRST EXAMPLE

An example of the data collection system 100 according to the first embodiment described above will now be described with reference to FIG. 7.

Figure 7:
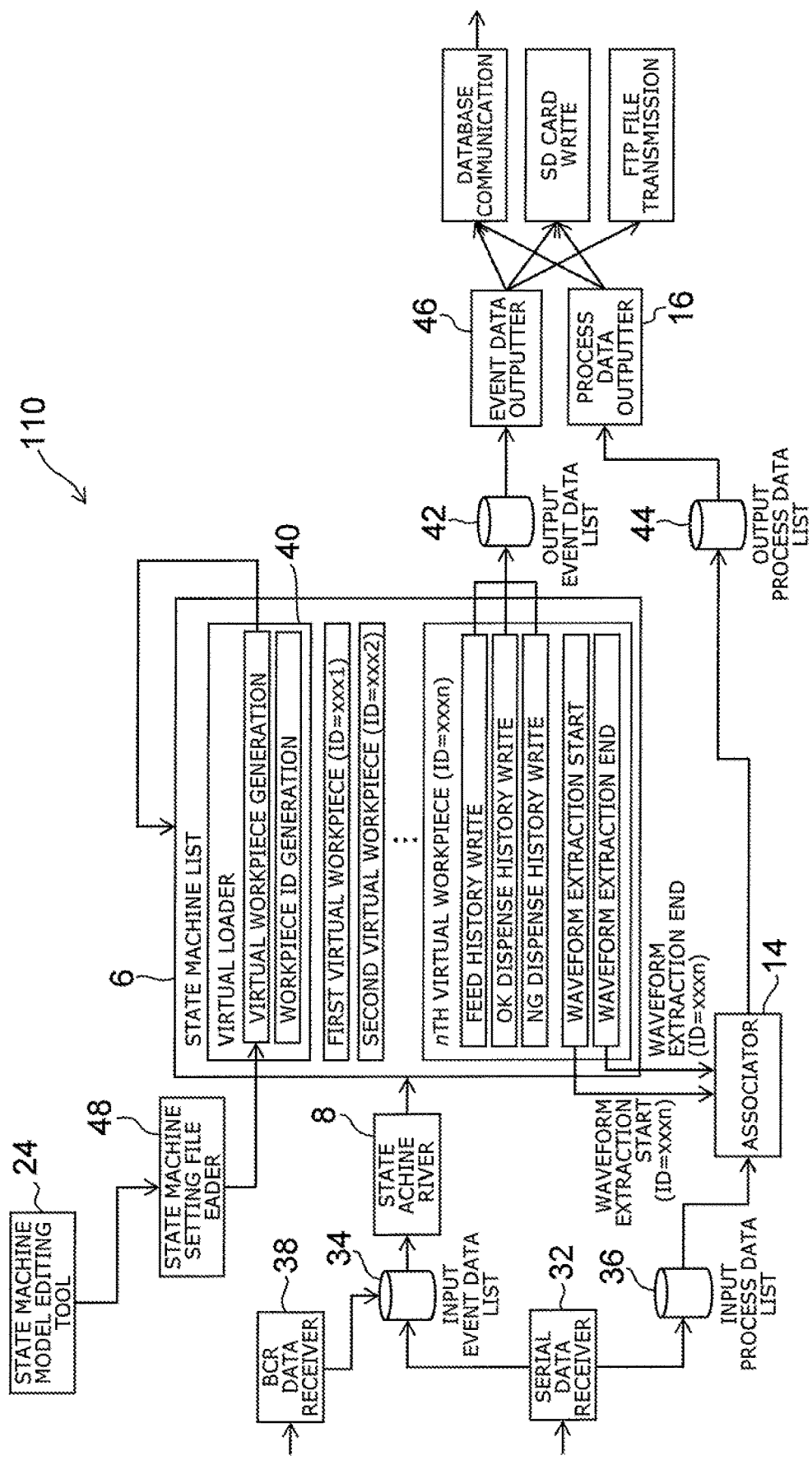
FIG. 7 is a block diagram illustrating the configuration of a data collection system according to the first example of the first embodiment.

FIG. 7 is a block diagram illustrating the configuration of a data collection system 110 according to the first example of the first embodiment.

As illustrated in FIG. 7, the data collection system 110 includes the state machine list 6, the state machine driver 8, the associator 14, the process data outputter 16, the state machine model editing tool 24, a serial data receiver 32, an input event data list 34, an input process data list 36, a Barcode Reader (BCR) data receiver 38, a virtual loader 40, an output event data list 42, an output process data list 44, an event data outputter 46, and a state machine setting file reader 48.

The serial data receiver 32 receives, as serial communication, the signals sensed by the sensors A1 to An and the sensor C. The serial data receiver 32 analyzes the received data. The serial data receiver 32 stores the event data in the input event data list 34. The serial data receiver 32 stores the waveform data in the input process data list 36. In other words, the serial data receiver 32 and the input event data list 34 function as the event data collector 2. The serial data receiver 32 and the input process data list 36 function as the process data collector 12.

The BCR data receiver 38 receives the data transmitted from the barcode reader used as the sensor B. The BCR data receiver 38 stores the received data in the input event data list 34.

The state machine list 6 retains the virtual loader 40 and the state machine of the virtual workpiece. The virtual loader 40 is a state machine that continues to exist without being deleted from the state machine list 6. The virtual loader 40 functions as a virtual loader.

Specifically, the virtual loader 40 has the function of executing the two actions of the virtual workpiece generation and the workpiece ID generation. When the workpiece feed event is generated, these actions are executed by the virtual loader 40. Thereby, the virtual workpiece that is provided with the ID is generated. In other words, in the data collection system 110, the virtual loader 40 which is a state machine functions as the state machine generator 4. The virtual loader 40 also is the generation timing definition file 22.

The ID that is provided by the action of the virtual loader 40 and the information of the actual workpiece (the lot ID) that is read by the BCR data receiver 38 are associated with the generated virtual workpiece. The association of the ID provided to the virtual workpiece and the information of the actual workpiece is performed when the action of the ID generation is executed by the virtual loader 40.

The virtual loader 40 generates the virtual workpiece according to the state machine model file 20. These files are read by the state machine setting file reader 48. These files are made or edited by the state machine model editing tool 24.

The state machine driver 8 drives each virtual workpiece according to the events stored in the input event data list 34. The virtual workpieces are driven by the state machine driver 8. The virtual workpieces further execute the actions of the feed history write, the OK dispense history write, the NG dispense history write, the waveform extraction start, and the waveform extraction end.

When the actions of the feed history write and the OK dispense history write or the NG dispense history write are executed, the histories are written to the output event data list 42.

As described above, the waveform extraction start and the waveform extraction end are actions for performing the extraction of the waveform data. The associator 14 receives these actions, extracts the waveform data from the input process data list 36, and associates the waveform data with the ID. The associator 14 stores the extracted waveform data in the output process data list 44.

The event data outputter 46 and the process data outputter 16 each refer to the output event data list 42 and the output process data list 44. These outputters output the stored data in a prescribed file format such as CSV, etc., and write the data to a recording medium such as an SD card, etc. Or, these outputters may transmit the data to an external server using FTP (File Transfer Protocol), etc. These outputters may perform database communication and may insert the data into an external database server using ODBC (Open Database Connectivity), etc.

SECOND EXAMPLE

Figure 8:
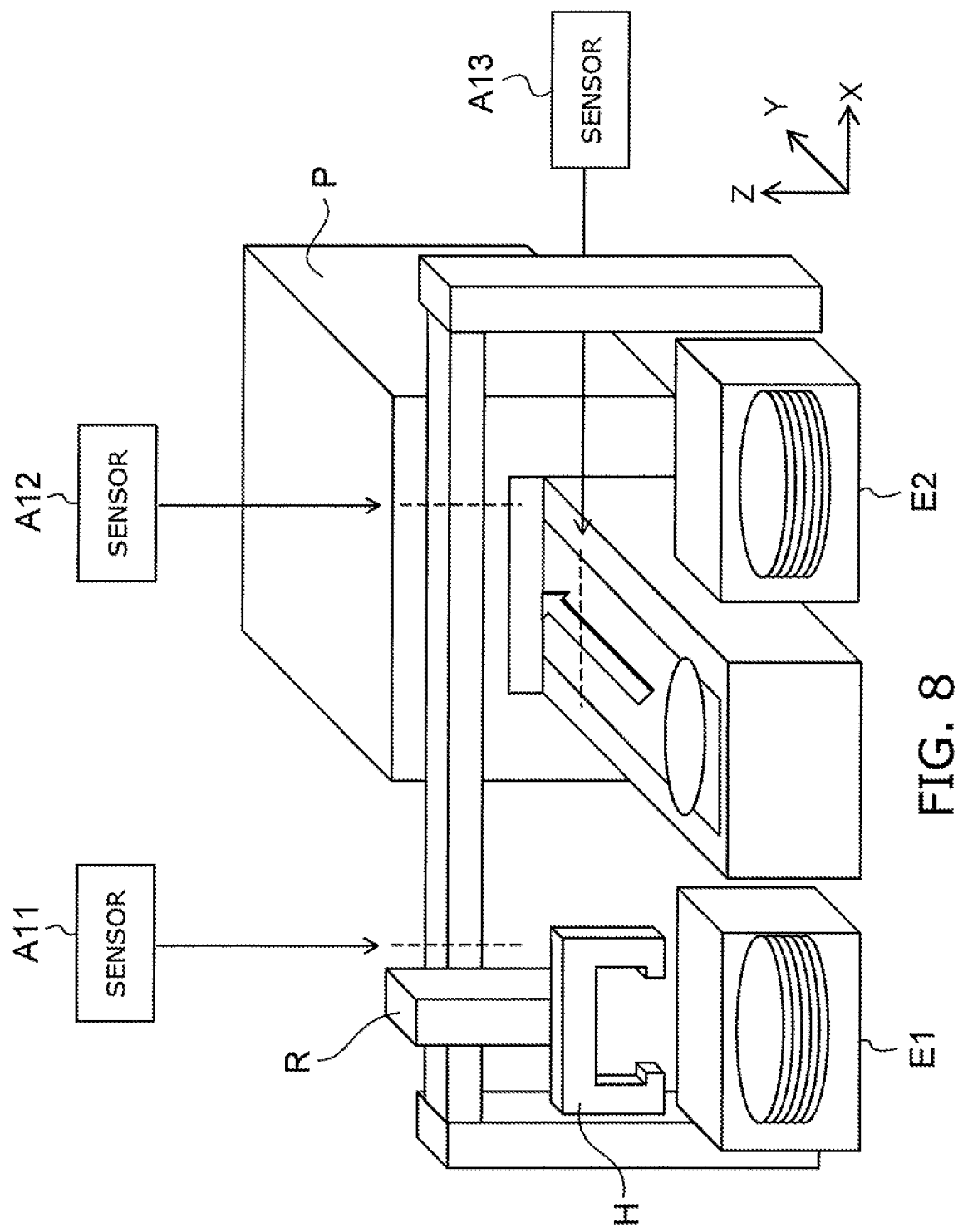
FIG. 8 is a schematic view illustrating an example of a manufacturing apparatus in which a data collection system according to a second example of the first embodiment is applied.

FIG. 8 is a schematic view illustrating an example of a manufacturing apparatus in which a data collection system according to a second example of the first embodiment is applied.

Figure 9:
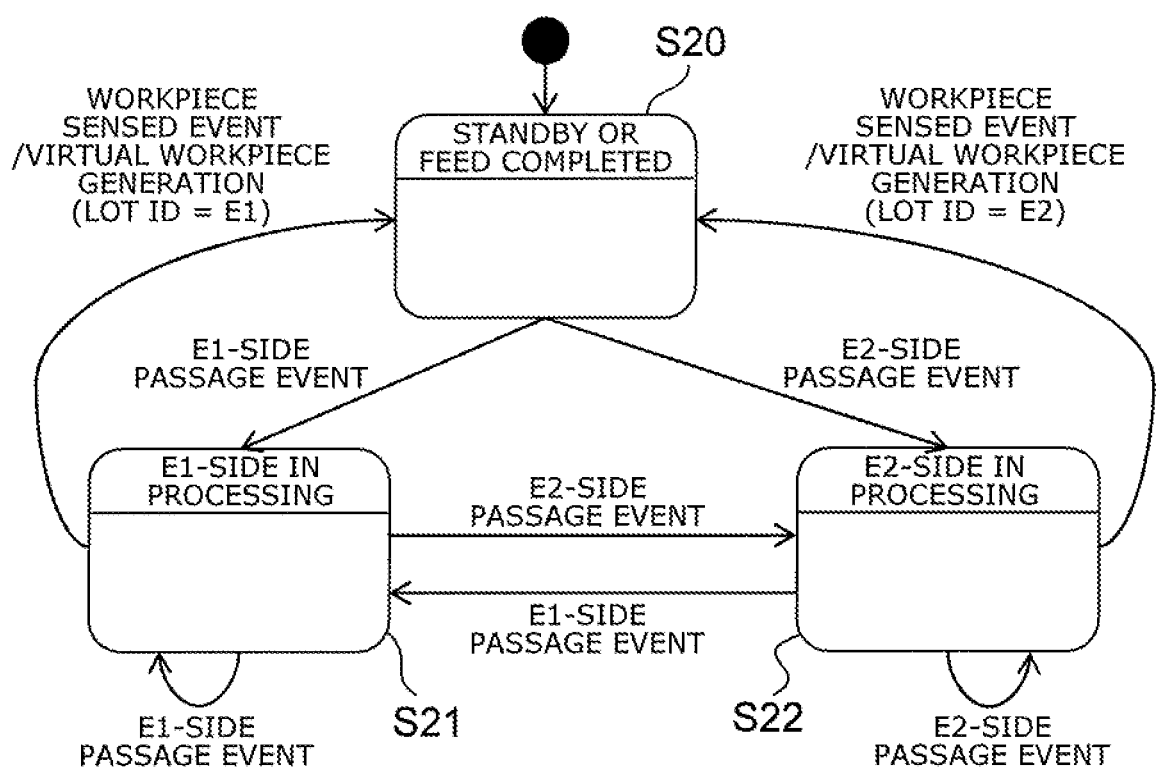
FIG. 9 is a state machine diagram illustrating the virtual loader of the data collection system according to the second example of the first embodiment.

FIG. 9 is a state machine diagram illustrating the virtual loader 40 of the data collection system according to the second example of the first embodiment.

For example, other than the virtual loader 40, the data collection system according to the second example has a similar configuration to the data collection system 110.

In the example illustrated in FIG. 8, a hand H is mounted to a robot R that is movable in an X-axis direction and a Z-axis direction. The hand H removes the workpieces one at a time from containers E1 and E2 and places the workpieces on a conveyor. The workpiece that is placed on the conveyor is moved into a processing chamber P; and the prescribed processing is performed.

The passage of the hand H is sensed by the sensors A11 and A12 at the positions illustrated by the broken lines. The belt on the conveyor is sensed by the sensor A13 at the position illustrated by the broken line when fed into the processing chamber P.

In the data collection system according to the example as illustrated in FIG. 9, the virtual loader 40 includes the three states of states S20 to S22.

The virtual loader 40 is in the state S20 before the actual workpiece is removed by the hand H or after the actual workpiece is fed into the processing chamber. When the sensor A11 senses that the hand H has moved to the container E1 side, the E1-side passage event occurs. The virtual loader 40 receives this event and transitions from the state S20 to the state S21.

After transitioning to the state S21, when the sensor A13 senses the workpiece being fed into the processing chamber, the workpiece sensed event occurs. The virtual loader 40 receives this event, transitions from the state S21 to the state S20, and generates a virtual workpiece. At this time, the virtual workpiece is associated with the lot ID of the container E1.

Similarly, when the virtual loader 40 is in the state S20, the hand H is sensed by the sensor A12. The E2-side passage event occurs. The virtual loader 40 receives this event and transitions from the state S20 to the state S22. After transitioning to the state S22, the workpiece is sensed by the sensor A13. The workpiece sensed event occurs. The virtual loader 40 receives this event and generates the virtual workpiece. The virtual workpiece is associated with the lot ID of the container E2.

In the state S21, in the case where the workpiece sensed event does not occur but the E2-side passage event occurs, the state transitions to the state S22. In the state S21, in the case where the E1-side passage event occurs again, the state S21 transitions back to itself.

Similarly, in the state S22, in the case where the workpiece sensed event does not occur but the E1-side passage event occurs, the state transitions to the state S21. In the state S22, in the case where the E2-side passage event occurs again, the state S22 transitions back to itself.

According to the data collection system according to the example, it is possible to associate the information such as the lot ID accompanying the container, etc., with each workpiece even in the case where the workpieces are removed from multiple containers.

According to the data collection system according to the example, even in the case where the processing performed by the processing chamber is different between lots, it can be discriminated from which lot the workpiece is removed. Therefore, it is possible to generate state machines corresponding to the recipe for each lot.

Second Embodiment

Figure 10:
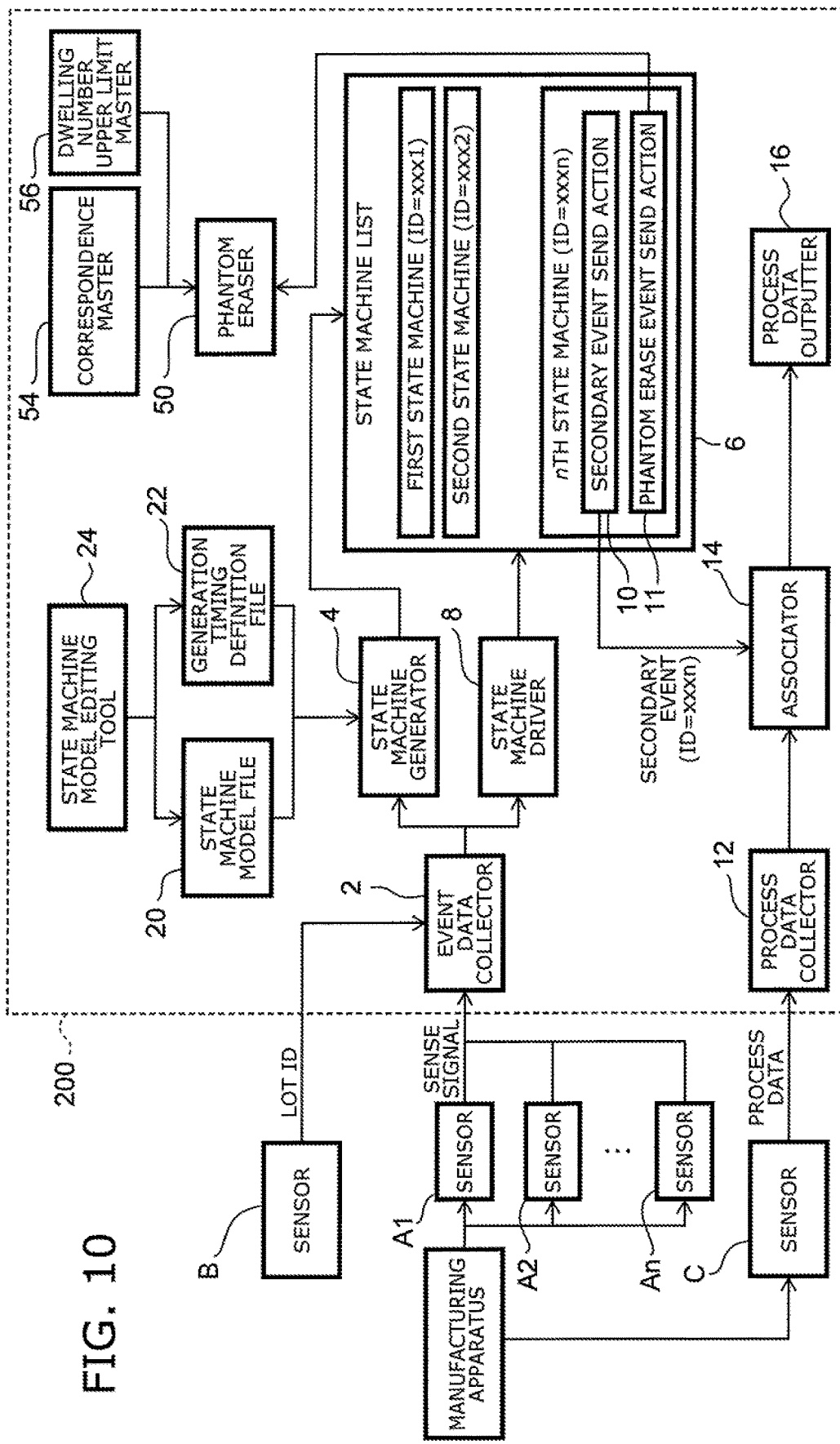
FIG. 10 is a block diagram illustrating the configuration of a data collection system according to a second embodiment.

FIG. 10 is a block diagram illustrating the configuration of a data collection system 200 according to a second embodiment.

The data collection system 200 according to the second embodiment further includes a phantom eraser 50, a correspondence master 54, and a dwelling number upper limit master 56 in the data collection system 100 according to the first embodiment. The state machine includes a phantom erase event send action 11 in addition to the secondary event send action 10.

As described in the description of the first embodiment, the generation and the driving of the virtual workpiece are performed in the data collection system 100. The generation and the driving are based on the sensing results of the actual workpiece from the sensors A1 to An of the manufacturing apparatus. In other words, the virtual workpiece is not driven to correspond to the movement of the actual workpiece in the case where the actual workpiece fed into the manufacturing apparatus moves without being sensed by the sensors. Therefore, if the actual workpiece is withdrawn or falls from the manufacturing apparatus without being sensed, the virtual workpiece that corresponds to the actual workpiece continues to be retained in the state machine list 6 without being erased (terminated).

In the description of the embodiment hereinbelow, the virtual workpiece (the state machine) that corresponds to an actual workpiece for which the passage is not sensed in the manufacturing apparatus and continues to be retained by the state machine list 6 is called a "phantom state machine."

If a phantom state machine exists, there are cases where the event data collector 2 collects the sense signal of the next actual workpiece after the actual workpiece that is not sensed. In such a case, the state machine driver 8 drives the phantom state machine based on the collected event. In other words, in the case where the nth virtual workpiece becomes a phantom state machine, the phantom state machine is driven based on the event that should drive the (n+1)th virtual workpiece. As a result, the process data that is to be associated with the (n+1)th virtual workpiece by the associator 14 is associated with the nth phantom state machine. Accurate data of the processing process of the workpiece is no longer obtained.

This problem is described referring to FIGS. 11A to 11C and FIGS. 12A to 12C.

FIGS. 11A to 11C and FIGS. 12A to 12C are schematic views describing the problem occurring due to the phantom state machine.

Figure 11A:
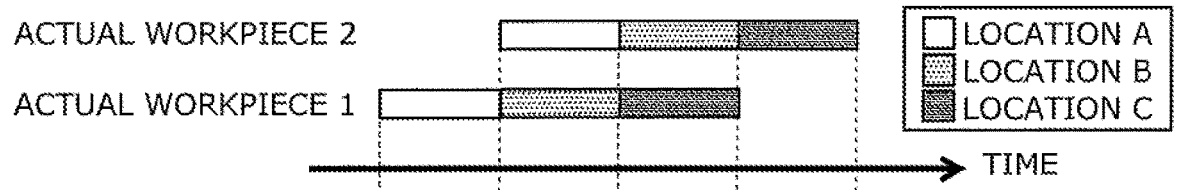
FIGS. 11A to 11C and FIGS. 12A to 12C are schematic views describing the problem occurring due to the phantom state machine.
Figure 11B:
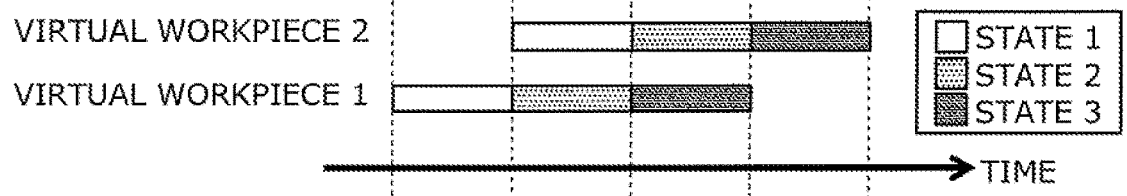
Figure 11C:
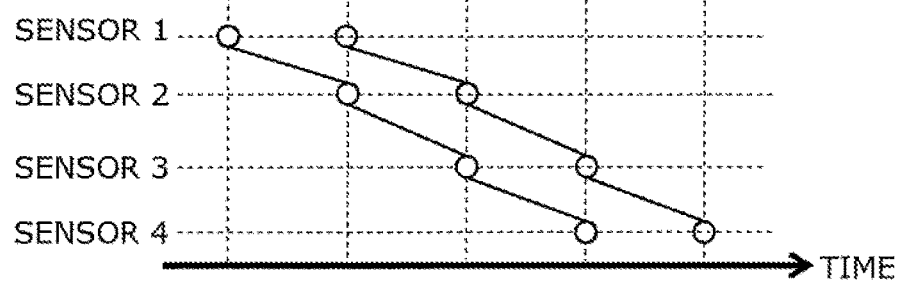
Figure 12A:
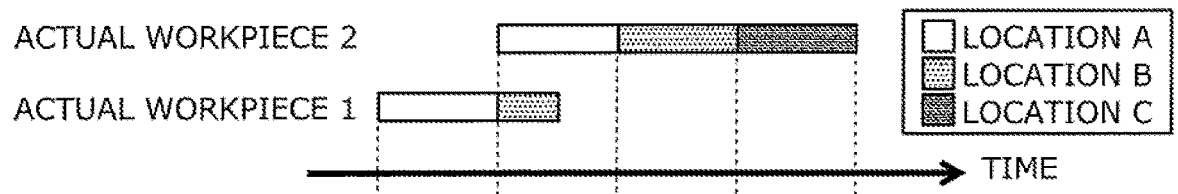
Figure 12B:
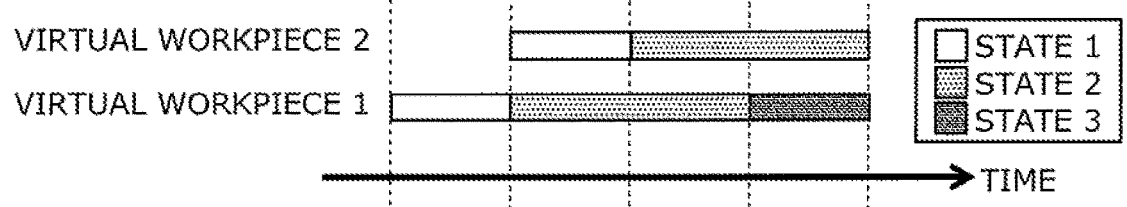
Figure 12C:
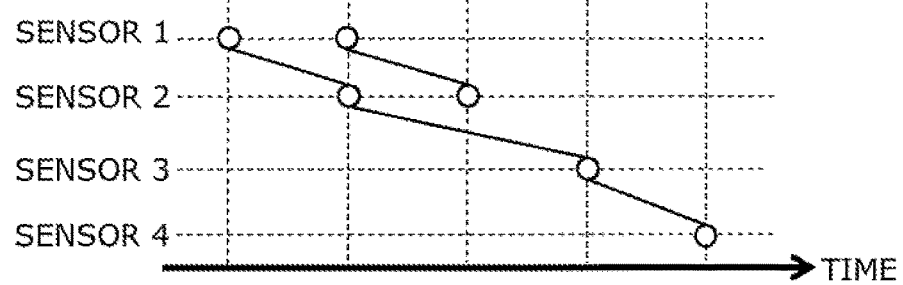

FIG. 11A and FIG. 12A illustrate the movements of the actual workpieces in the manufacturing apparatus. FIG. 11C and FIG. 12C respectively illustrate the sensing results of the sensors obtained corresponding to the movements of the actual workpieces of FIG. 11A and FIG. 12A. FIG. 11B and FIG. 12B respectively illustrate the state transitions of the virtual workpieces based on the sensing results of FIG. 11C and FIG. 12C. In FIG. 11C and FIG. 12C, the sense signals are shown as being connected by solid lines for each ID of the associated virtual workpiece.

FIGS. 11A to 11C illustrate the situation in the case where the phantom state machine does not occur. The movements of the actual workpieces are sensed by the sensors 1 to 4; and the states of each virtual workpiece transition based on the sensing results of the sensors 1 to 4.

In such a case, as described in the first embodiment, the data of the actual workpiece is accompanied by the ID and is collected; and the processing processes of the actual workpiece can be tracked correctly.

FIGS. 12A to 12C illustrate the situation in the case where the phantom state machine occurs. In the example as illustrated in FIG. 12A and FIG. 12C, the actual workpiece 1 is not sensed by the sensor at the location B and is withdrawn from the manufacturing apparatus. At this time, the corresponding virtual workpiece 1 continues to be retained by the state machine list 6. As a result, as illustrated in FIG. 12C, the sense signal from the sensor 3 when the actual workpiece 2 moves from the location B to the location C is associated with the virtual workpiece 1. The virtual workpiece 1 transitions to the state 3 corresponding to the location C. On the other hand, the virtual workpiece 2 that corresponds to the actual workpiece 2 remains in the state 2 without transitioning to the state 3. Thereby, in the case where the processing of the actual workpiece 2 is performed at the location C, the process data is not associated with the virtual workpiece 2 but is associated with the virtual workpiece 1.

The data collection system 200 according to the embodiment includes the phantom eraser 50 described above to prevent such a shift of the association of the data. Each of the state machines includes the phantom erase event send action 11.

The phantom erase event send action 11 generates a phantom erase event and sends the phantom erase event when the virtual workpiece transitions to another state. The phantom eraser 50 searches for phantom state machines according to the phantom erase event. At this time, the phantom eraser 50 refers to the correspondence master 54 and the dwelling number upper limit master 56, searches for a phantom state machine, and erases (terminates) the phantom state machine.

The state of each of the virtual workpieces corresponds to the dwell location of the actual workpiece in the manufacturing apparatus. The correspondence between the multiple possible states of the virtual workpiece and the multiple locations of the manufacturing apparatus are stored in the correspondence master 54.

The number of the actual workpieces that can dwell at each location of the manufacturing apparatus is limited. Therefore, the upper limit of the number of the actual workpieces that can dwell at each location of the manufacturing apparatus (the dwelling number upper limit of the location; a second dwelling number upper limit), and the upper limit of the number of the virtual workpieces that can dwell in each state of the manufacturing apparatus (the dwelling number upper limit of the state; a first dwelling number upper limit) are stored in the dwelling number upper limit master 56. Here, the case is illustrated where the dwelling number upper limit of the location and the dwelling number upper limit of the state are stored in one master. Such information may be stored separately in different masters.

The operation for erasing the phantom state machine of the data collection system 200 will now be described in detail with reference to FIG. 13.

Figure 13:
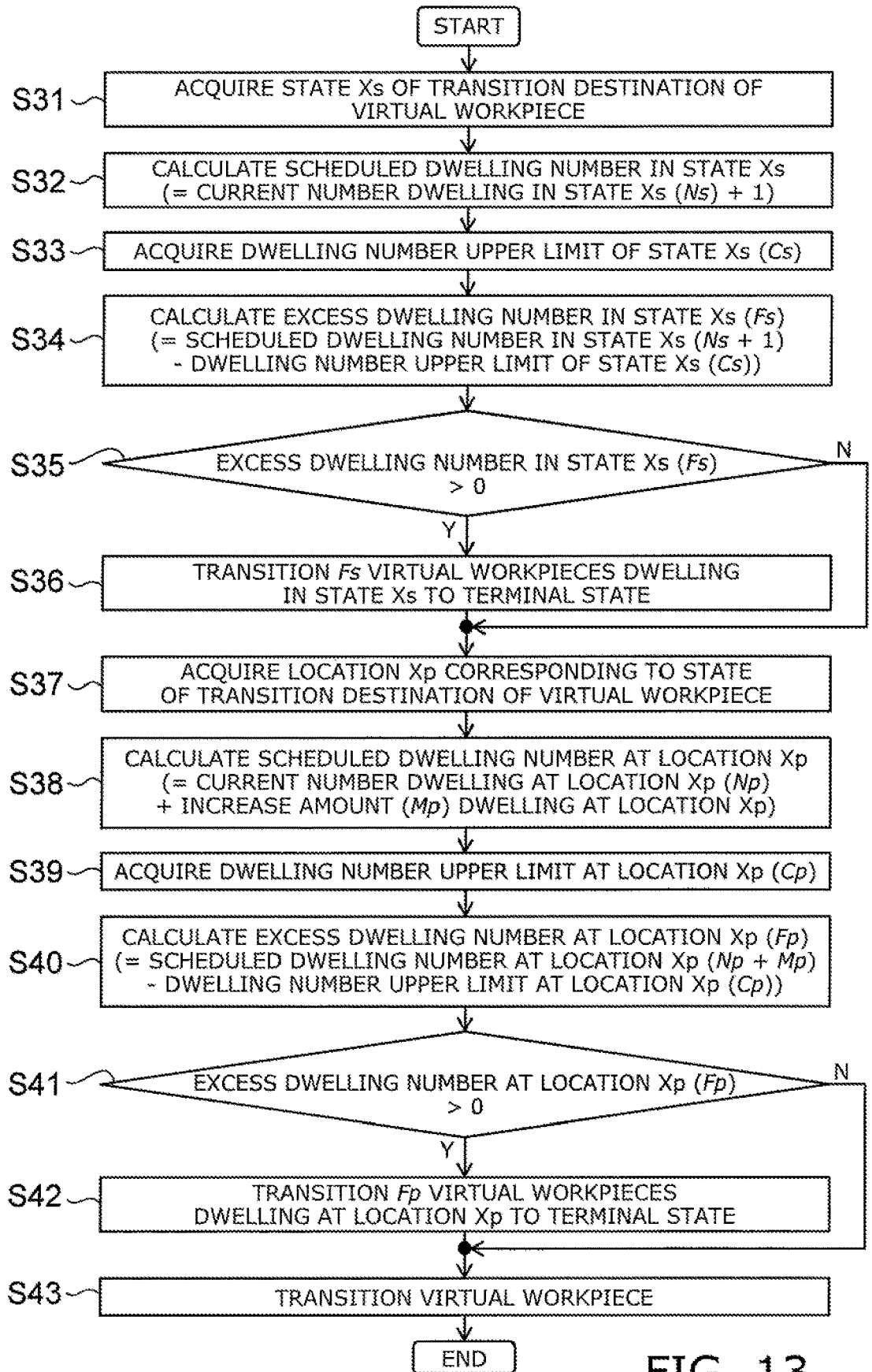
FIG. 13 is a flowchart illustrating a portion of the operation of the data collection system 200 according to the second embodiment.

FIG. 13 is a flowchart illustrating a portion of the operation of the data collection system 200 according to the second embodiment.

The passages of the actual workpiece are sensed by the sensors A1 to An. Based on the sensing results, the virtual workpiece is caused to transition from one state to another state by the state machine driver 8. At this time, the phantom erase event send action 11 is executed; and the operation illustrated in the flowchart of FIG. 13 is started.

In step S31, the phantom eraser 50 acquires a state Xs (a first state) of the transition destination of the virtual workpiece.

In step S32, the phantom eraser 50 calculates, as the scheduled dwelling number in the state Xs (a first scheduled dwelling number), the number of the virtual workpieces in the state Xs after the virtual workpiece will transition. The scheduled dwelling number is obtained by adding the number of the virtual workpieces (one) increasing after the transition to the current number of the virtual workpieces (Ns) dwelling in the state Xs (before the transition).

In step S33, the phantom eraser 50 refers to the dwelling number upper limit master 56 and acquires the dwelling number upper limit of the state Xs (Cs).

In step S34, the phantom eraser 50 calculates the excess dwelling number in the state Xs (Fs) (a first excess dwelling number) by subtracting the dwelling number upper limit (Cs) from the scheduled dwelling number in the state Xs (Ns+1) calculated in step S32.

In step S35, the phantom eraser 50 determines whether or not the excess dwelling number exceeds 0.

In the case where 0 is exceeded, the phantom eraser 50 causes the Fs virtual workpieces in the state Xs to transition to the terminal state in step S36. At this time, the Fs virtual workpieces that transitioned previously to the state Xs transition to the terminal state as phantom state machines. The virtual workpieces that transition to the terminal state expire and are deleted from the state machine list 6.

In step S37, the phantom eraser 50 refers to the correspondence master 54 and acquires a location Xp (a first location) corresponding to the state of the transition destination of the virtual workpiece.

In step S38, the phantom eraser 50 calculates, as the scheduled dwelling number at the location Xp (a second scheduled dwelling number), the number of the virtual workpieces dwelling at the location Xp after the virtual workpiece has transitioned. The scheduled dwelling number is obtained by adding the number of the virtual workpieces (Mp) increasing after the transition to the current number of the virtual workpieces (Np) dwelling at the location Xp (before the transition).

In step S39, the phantom eraser 50 refers to the dwelling number upper limit master 56 and acquires the dwelling number upper limit of the location Xp.

In step S40, the phantom eraser 50 calculates the excess dwelling number (Fp) (the second excess dwelling number) by subtracting the dwelling number upper limit (Cp) from the scheduled dwelling number at the location Xp (Np+Mp) calculated in step S38.

In step S41, the phantom eraser 50 determines whether or not the excess dwelling number exceeds 0.

In the case where 0 is exceeded, the phantom eraser 50 causes the Fp virtual workpieces dwelling at the location Xp (in the state corresponding to the location Xp) to transition to the terminal state in step S42. At this time, the Fp virtual workpieces that previously dwelled at the location Xp transition to the terminal state as phantom state machines. The virtual workpieces that transition to the terminal state expire and are deleted from the state machine list 6.

Subsequently, in step S43, the virtual workpiece transitions to the state Xs of the transition destination.

By the steps recited above, it is possible to erase (terminate) the phantom state machines at the transition destination of the virtual workpiece. As a result, it is possible to correctly associate the sense signal at the actual workpiece passage and the process data at the actual workpiece processing with the corresponding virtual workpiece.

In other words, according to the embodiment, compared to the first embodiment, it is possible to track the processing processes of each workpiece more accurately.

In the flowchart illustrated in FIG. 13, a case is described where the excess dwelling number at the location Xp is verified after verifying the excess dwelling number in the state Xs of the transition destination of the virtual workpiece. The order of these steps is modifiable as appropriate. Or, these steps may be executed simultaneously in parallel.

A case is described in the data collection system 200 illustrated in FIG. 10 where the phantom eraser 50 is initiated by the phantom erase event send action 11 included in the state machine. The state machine may include an action that performs the searching and the erasing of the phantom state machine.

Figure 14:
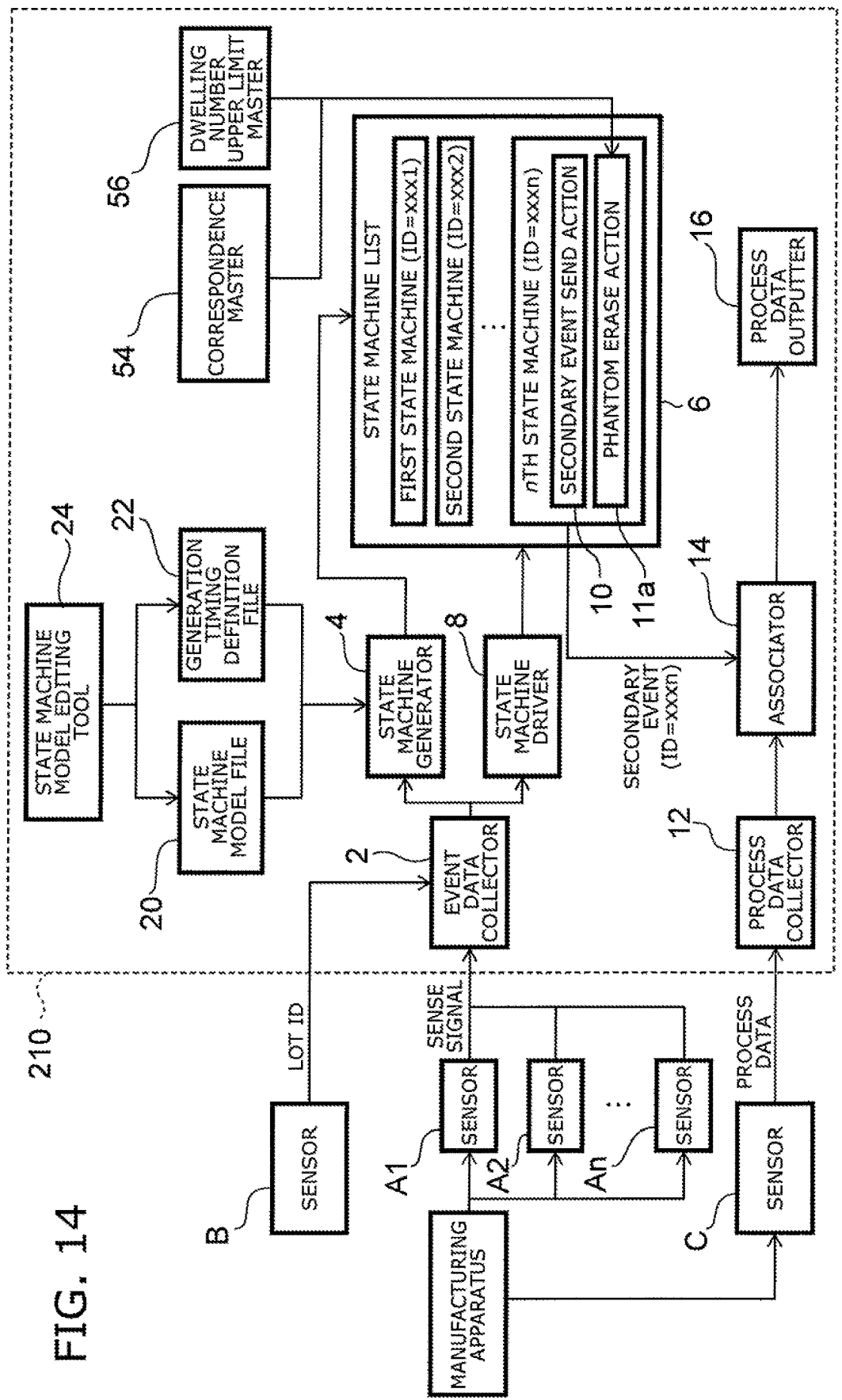
FIG. 14 is a block diagram illustrating the configuration of a data collection system 210 according to a modification of the second embodiment.

FIG. 14 is a block diagram illustrating the configuration of a data collection system 210 according to a modification of the second embodiment.

Instead of the phantom eraser 50, the state machine includes a phantom erase action 11a in the data collection system 210.

When the state machine transitions in the data collection system 210, the operations of the flowchart illustrated in FIG. 13 are executed as an action of the state machine. In other words, the phantom erase action 11a functions as the phantom eraser 50.

Such a data collection system also may be considered to include a "phantom eraser."

According to the data collection system 210 including the configuration that functions as the phantom eraser 50, similarly to the data collection system 200, it is possible to track the processing processes of each workpiece more accurately.

Here, a case is described where the dwelling number upper limits at each location of the manufacturing apparatus may be different from each other. In such a case, as described above, it is necessary to refer to the correspondence master 54 and/or the dwelling number upper limit master 56 to acquire the correspondence between the states of the virtual workpiece and the locations of the manufacturing apparatus and the dwelling number upper limit of each location.

It is also possible for these masters to be unnecessary by increasing the number of the sensors provided in the manufacturing apparatus so that the locations of the manufacturing apparatus and the states of the virtual workpiece have a 1:1 correspondence. If the locations of the manufacturing apparatus and the states of the virtual workpiece have a 1:1 correspondence, the upper limit of the number dwelling is set uniformly to 2. In such a case, if a virtual workpiece exists in the same state at the transition destination, the virtual workpiece is terminated as a phantom state machine.

In the description of the embodiment, the model that corresponds to the actual workpiece is expressed as a state machine. In the case where the actual workpiece is withdrawn, etc., without being sensed, the phantom state machine that corresponds to the actual workpiece is erased.

The invention according to the embodiment is applicable even in the case where the model corresponding to the actual workpiece is expressed using something other than a state machine. Even in the case where another model is used, if the actual workpiece is withdrawn, etc., without being sensed, the model that corresponds to the actual workpiece continues to remain in the data collection system as a phantom. As a result, the data that is obtained in the manufacturing apparatus can no longer be associated correctly with the model.

For example, the invention according to the embodiment is applicable even in the case where the workpiece is expressed as a model using a flowchart, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A data collection system, comprising,
circuitry,
the circuitry generating a state machine as a model corresponding to a workpiece, the state machine including a plurality of states, a transition between the plurality of states, and an action, the circuitry generating the state machine and generating an ID for the state machine in response to acquisition of event data indicating a feeding of the workpiece into a manufacturing apparatus, the action sending an event accompanied by the ID, the manufacturing apparatus including a processing chamber configured to process the workpiece,
the circuitry driving the state machine by sending another event, the other event being generated in response to acquisition of other event data indicating a passage of the workpiece into the processing chamber.

2. The system according to claim 1, wherein
the circuitry collecting process data when the workpiece is processed,
the state machine includes a secondary event send action,
the secondary event send action sends a secondary event for performing an extraction of the process data when an entry to or an exit from a prescribed state is performed by being driven,
the secondary event is accompanied by the ID,
the circuitry provides, to the process data, the ID accompanying the secondary event when the secondary event is received, and
the circuitry performs at least one of file storage or data transmission of the process data provided with the ID.

3. The system according to claim 2, wherein
the state machine sends the secondary event when the workpiece is processed in the processing chamber,
the circuitry extracts a portion of the process data according to the received secondary event and provides, to the portion of the process data, the ID accompanying the secondary event, and
the circuitry performs at least one of file storage or data transmission of the portion of the process data provided with the ID.

4. The system according to claim 2, wherein the process data is waveform data of at least one of a pressure or a temperature when the workpiece is processed.

5. The system according to claim 1, further comprising:
a state machine model file defining a state list and an incoming event list, the state list including possible states of the generated state machine;
a state machine model editing tool configured to allow a user to edit the state machine model file on a GUI screen, and to be able to select, from a plurality of the state machine model files, one of the state machine model files corresponding to the manufacturing apparatus used as an object of data collection; and
a state machine generation timing definition file defining an event generated by the state machine.

6. The system according to claim 1, wherein the circuitry searches for and terminates the state machine corresponding to the workpiece not having a passage sensed in the manufacturing apparatus.

7. The system according to claim 6, further comprising:
a correspondence master storing a plurality of the states, a plurality of locations of the manufacturing apparatus, and a correspondence between the plurality of states and the plurality of locations; and
a dwelling number upper limit master storing a first dwelling number upper limit and a second dwelling number upper limit, the first dwelling number upper limit being the upper limit of the state machines that can dwell in each of the plurality of states, the second dwelling number upper limit being the upper limit of the state machines that can dwell at each of the plurality of locations,
the circuitry performing, when the state machine transitions:
referring to the correspondence master and acquiring a first location corresponding to a first state after the transition;
calculating a first scheduled dwelling number and a second scheduled dwelling number, the first scheduled dwelling number being of the state machines in the first state, the second scheduled dwelling number being of the state machines at the first location,
referring to the dwelling number upper limit master and acquiring the first dwelling number upper limit of the first state and the second dwelling number upper limit of the first location;
calculating a first excess dwelling number from the first scheduled dwelling number and the first dwelling number upper limit;
terminating, as a phantom state machine, the first excess dwelling number of state machines in the first state;
calculating a second excess dwelling number from the second scheduled dwelling number and the second dwelling number upper limit; and
terminating, as the phantom state machine, the second excess dwelling number of state machines at the first location.

8. The system according to claim 1, wherein
the circuitry collects a first sense signal as the event data and a second sense signal as the other event data,
the first sense signal being acquired when the feeding of the workpiece into the manufacturing apparatus is sensed, and
the second sense signal being acquired when the passage of the workpiece in the manufacturing apparatus is sensed.

9. A processing system, comprising:
the data collection system according to claim 2;
a first sensor sensing a feeding of a workpiece into the manufacturing apparatus; and
a second sensor sensing a passage of the workpiece in the manufacturing apparatus,
the circuitry generating the state machine and generating the ID when a sense signal transmitted from the first sensor is collected as the event data, and
the circuitry driving the state machine by sending, to the state machine, the other event corresponding to a sense signal transmitted from the second sensor.

10. The processing system according to claim 9, further comprising:
a third sensor sensing the process data and transmitting the process data to the circuitry; and
a fourth sensor sensing information accompanying the workpiece,
the circuitry performing an association between the ID and the information.

11. The processing system according to claim 9, wherein
the manufacturing apparatus includes a chamber and controls at least one of temperature or pressure in the processing chamber, and
the workpiece is conveyed into the processing chamber.

12. A storage medium storing a program for causing a computer to function as:
a generator generating a state machine and generating an ID for the state machine in response to acquisition of event data indicating a feeding of a workpiece into a manufacturing apparatus, the state machine including a plurality of states, a transition between the plurality of states, and an action, the state machine being generated as a model corresponding to each of the workpieces, the action sending an event accompanied by the ID, the manufacturing apparatus including a processing chamber configured to process the workpiece; and
a driver driving the state machine by sending another event, the other event being generated in response to acquisition of other event data indicating a passage of the workpiece into the processing chamber.

13. The storage medium according to claim 12, wherein the program further causes the computer to function as:
a process data collector collecting process data when the workpiece is processed;
an associator; and
a process data outputter,
the state machine includes a secondary event send action,
the secondary event send action sends a secondary event for performing an extraction of the process data when an entry to or an exit from a prescribed state is performed by being driven by the driver,
the secondary event is accompanied by the ID,
the associator provides, to the process data, the ID accompanying the secondary event when the secondary event is received, and
the process data outputter performs at least one of file storage or data transmission of the process data provided with the ID.

14. The storage medium according to claim 12, wherein the program further causes the computer to function as an eraser searching for and terminating the state machine corresponding to the workpiece not having a passage sensed in the processing system.

15. The storage medium according to claim 14, wherein the eraser in the program performs, when the state machine transitions:
acquiring a first location corresponding to a first state after the transition;
calculating a first scheduled dwelling number and a second scheduled dwelling number, the first scheduled dwelling number being of the state machines in the first state, the second scheduled dwelling number being of the state machines at the first location;
acquiring the first dwelling number upper limit of the first state and the second dwelling number upper limit of the first location;
calculating a first excess dwelling number from the first scheduled dwelling number and the first dwelling number upper limit;
terminating, as a phantom state machine, the first excess dwelling number of state machines in the first state;
calculating a second excess dwelling number from the second scheduled dwelling number and the second dwelling number upper limit; and
terminating, as the phantom state machine, the second excess dwelling number of state machines at the first location.

16. The storage medium according to claim 12, wherein the program further causes the computer to function as an event data collector collecting a first sense signal as the event data and a second sense signal as the other event data,
the first sense signal is acquired when the feeding of the workpiece into the processing system is sensed, and
the second sense signal is acquired when the passage of the workpiece in the processing system is sensed.

17. A data collection system, comprising:
a generator generating a state machine as a model corresponding to a workpiece, the state machine including a plurality of states, a transition between the plurality of states, and an action, the generator generating the state machine and generating an ID for the state machine in response to acquisition of event data indicating a feeding of the workpiece into a processing system, the action sending an event accompanied by the ID;
a driver driving the state machine by sending another event, the other event being generated in response to acquisition of other event data indicating a passage of the workpiece in the processing system; and
an eraser searching for and terminating the state machine corresponding to the workpiece not having a passage sensed in the processing system.

* * * * *